(12) United States Patent
Ramesh (10) Patent No.: US 12,053,702 B2
(45) Date of Patent: Aug. 6, 2024

(54) SYSTEMS AND METHODS FOR EVALUATING GAME ELEMENTS

(71) Applicant: Vignav Ramesh, Saratoga, CA (US)

(72) Inventor: Vignav Ramesh, Saratoga, CA (US)

( * ) Notice: Subject to any disclaimer, the term of this patent is extended or adjusted under 35 U.S.C. 154(b) by 366 days.

(21) Appl. No.: 17/447,508

(22) Filed: Sep. 13, 2021

(65) Prior Publication Data

US 2023/0080056 A1 Mar. 16, 2023

(51) Int. Cl.
*A63F 13/60* (2014.01)
*G06F 18/214* (2023.01)
*G06N 20/00* (2019.01)
*G06V 20/40* (2022.01)

(52) U.S. Cl.
CPC ............ *A63F 13/60* (2014.09); *G06F 18/214* (2023.01); *G06N 20/00* (2019.01); *G06V 20/41* (2022.01); *G06V 20/47* (2022.01); *A63F 2300/6009* (2013.01); *G06V 20/44* (2022.01)

(58) Field of Classification Search
None
See application file for complete search history.

(56) References Cited

U.S. PATENT DOCUMENTS

| | | | |
|---|---|---|---|
| 8,308,562 B2 | 11/2012 | Patton | |
| 8,488,023 B2 | 7/2013 | Bacivarov et al. | |
| 9,031,293 B2 | 5/2015 | Kalinli-Akbacak | |
| 10,843,078 B2 | 11/2020 | El Kaliouby et al. | |
| 11,790,734 B2 * | 10/2023 | Lamb | G07F 17/3211 463/13 |
| 2015/0286858 A1 | 10/2015 | Shaburov et al. | |
| 2021/0027119 A1 * | 1/2021 | Skuin | G06V 20/42 |
| 2022/0008824 A1 * | 1/2022 | Kothari | G06N 3/088 |

OTHER PUBLICATIONS

Affectiva website. Affectiva media analytics. Affectiva Automotive AI. Retrieved Dec. 22, 2020, from http://go.affectiva.com/affdex-for-market-research.
Sun, C., Myers, A., Vondrick, C., Murphy, K., & Schmid, C. (Sep. 11, 2019). Videobert: A joint model for video and language representation learning. arXiv.org. Retrieved Sep. 8, 2021, from https://arxiv.org/abs/1904.01766.

* cited by examiner

*Primary Examiner* — Ronald Laneau
(74) *Attorney, Agent, or Firm* — Fortem IP LLP (57) ABSTRACT

A method for evaluating a game element is disclosed herein. In one example, the method includes receiving a data set representing the game element and generating a predicted response to the game element by inputting the data set into a machine learning model. In some embodiments, the machine learning model is trained on a plurality of training samples derived from previous gameplay data. In some embodiments, each training sample includes a gameplay event and a player response associated with the gameplay event.

20 Claims, 3 Drawing Sheets

SYSTEMS AND METHODS FOR EVALUATING GAME ELEMENTS

TECHNICAL FIELD

The present technology relates to systems and methods for evaluating game elements.

BACKGROUND

A videogame is an electronic game where a user (typically known as a "player") enters commands via an input device (e.g., a controller, mouse, keyboard, etc.) and receives feedback via an output device (e.g., a display, monitor, screen, etc.). Designing and developing a videogame can be a long and burdensome task that generally involves several stages. For example, the game development process can include a pre-production phase (e.g., budgeting, storyboarding, etc.), a production phase (e.g., building, modeling, and/or developing the game), a testing phase (e.g., debugging, feature adjustments, etc.), a pre-launch phase (e.g., alpha release, beta releases, early access), a launch phase (e.g., initial release of the game), and a post-launch phase (e.g., patches and new content). These phases can each last several months or even years, such that it often takes several years to design and fully develop a videogame.

An important part of designing and developing a videogame involves designing and developing the game's elements or features. Game elements can be added into the game and/or modified throughout the game development process, sometimes even after the game has been publicly released. Ensuring players will enjoy a videogame's game elements is essential to any videogame's success. For example, a videogame with a poor initial release can affect the long-term success of a game, as poor first impressions and reviews of the videogame can greatly hinder the videogame's growth. In some scenarios, adding game elements into an already launched game can help keep the game fresh and extend the life of the game. If the added game elements are not well received, however, the lifespan and profitability of the game can suffer. In a conventional game development process, game elements often undergo playtesting, which typically involves a group of human testers reviewing and testing existing game elements. This playtesting process, however, is generally time-consuming, tedious, and costly, because the game elements in question must be built and manually analyzed.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

DETAILED DESCRIPTION

The present technology relates to systems, methods, and devices for evaluating videogames. In some embodiments, for example, a game evaluation system uses at least one machine learning model that is trained on gameplay data to predict how players will respond to a game element. The game evaluation system can receive input data on a new game element for a particular videogame, generate a prediction about how players will respond to the new game element using the trained machine learning model, and output the prediction.

The present technology can provide many advantages for videogame design and development. For example, designing a videogame and/or implementing changes to a videogame can be costly and time consuming for a game developer. The game developer often must completely build a new game element they would like to deploy in the videogame without fully understanding how the players will respond to the new game element. To help understand how players will respond to new game elements, game developers can use a panel of human testers to review the new game element. However, this process can be time-consuming (as the game testers from the panel need to play the game to experience the new game element) and costly (as the game testers can be expensive and the game element must be built for the game testers). In some situations, game developers can spend several months reviewing gameplay data to determine if players will enjoy a new game element. If the new game element is reviewed poorly during testing, most or all of the time building and reviewing the new game element is essentially wasted. This wasted time adds additional costs to developing the videogame. However, despite these risks, game developers still spend a lot of time and resources on testing and reviewing new game elements, as ensuring these new game elements are well received can be essential to the success of the videogame.

In some scenarios, game developers do not have adequate resources to reliably test and evaluate game features. These scenarios are particularly prevalent for smaller game development organizations (e.g., independent game developers or organizations with 10 or fewer members). Smaller game development organizations can often have smaller budgets, preventing the game developers from hiring game testers to evaluate their game elements due to high expenses. Because these game developers cannot outsource the game testing, the game developers often must review and test the game elements themselves. This situation greatly increases the amount of time it takes to develop a finished game element, as the time spent evaluating a game element is time the developer cannot spend on finishing other aspects of the videogame.

To address these and other challenges, embodiments of the present technology provide a game evaluation system that utilizes machine learning to predict whether players will enjoy new game elements. The game evaluation system can provide accurate predictions without the game developer needing to fully build the game element. For example, in some embodiments of the present technology, the game evaluation system can evaluate a textual description of the new game element and generate and output a prediction of player response based on the textual description. Accordingly, this and other embodiments of the present technology can greatly reduce the time and cost that is needed to evaluate game elements.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
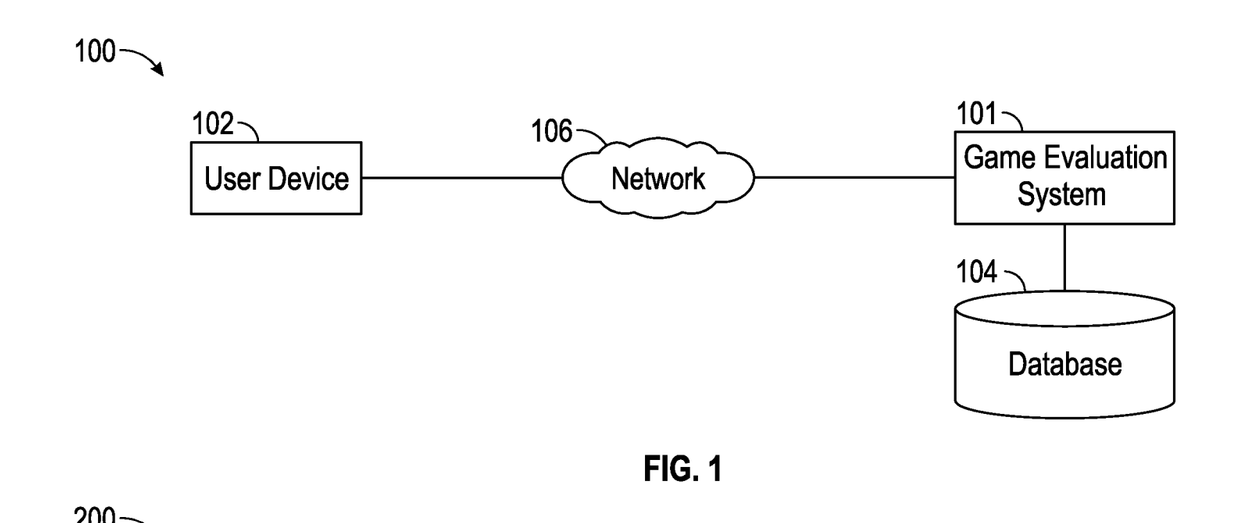
FIG. 1 is a schematic diagram of a computing environment in which a game evaluation system operates in accordance with embodiments of the present technology.

FIG. 1 is a schematic diagram of a computing environment 100 in which a game evaluation system 101 ("system 101") operates in accordance with embodiments of the present technology. As shown in FIG. 1, the system 101 is operably coupled to one or more user devices 102 via a network 106. Additionally, the system 101 is operably coupled to at least one database or storage component 104 ("database 104"). As described in greater detail herein, the system 101 can be configured to generate predictions related to a game element. A game element can be any feature or component of a videogame that influences the player's gameplay experience. For example, the game element can include the game mechanics, game items, the user interface, art design, audio design, input devices, and/or other features of a videogame. In some embodiments, the system 101 receives input data (e.g., gameplay data and/or data related to a game element) and processes, analyzes, interprets, evaluates, etc. the input data in order to perform the various operations described herein, such as processing the input data to generate training data, training one or more machine learning models (e.g., a deep learning model) to predict a player response to a game element, and/or generating predictions of a player response to a game element using the trained model(s). The system 101 can also be configured to output notifications, recommendations, and/or other information to a user based on the predicted response. The system 101 can be or include a server or other computing system or device having processors, memory, software and/or hardware components configured to implement the various methods described herein. In some embodiments, the system 101 is implemented as a distributed "cloud" computing system across any suitable combination of hardware and/or virtual computing resources.

In some embodiments, the system 101 receives input data from and/or transmits output data to one or more user devices 102. Although FIG. 1 illustrates a single user device 102, in other embodiments the system 101 can be connected to a plurality of user devices 102. The user device 102 can be a device associated with an operator, game developer, player, or other user. The user device 102 can include a computing device, such as a computer, a mobile device (e.g., a smartphone or tablet computer), a gaming system (e.g., Xbox console, PlayStation console, Nintendo console), etc.

The database 104 can be used to store various types of data obtained and/or used by the system 101 and/or the user devices 102. For example, any of the data described herein can be stored in the database 104, such as predictions generated by the system 101, game element data, screen recording data, player audio data, player video data, training data, etc. The database 104 can store information in various formats, such as table format, column-row format, etc.

In operation, one or more users (e.g., a game developer, player, etc.) can access and interact with the system 101 via the user devices 102. For example, the user can send input data to the system 101 (e.g., videogame data, gameplay data, game element data, etc.) and/or receive data from the system 101 (e.g., predictions about a game element). In some embodiments, upon obtaining appropriate data (e.g., game element, predictions about a game element, etc.), the user device 102 can generate an instruction and/or command to the system 101, for example, to process the obtained data, store the data in the database 104, extract additional data from one or more databases, and/or perform analysis of the data. The instruction/command can be in a form of a query, a function call, and/or any other type of instruction/command, and can be provided in any desired manner by the user. The user device 102 can also instruct the system 101 to perform an analysis of data stored in the database 104 and/or inputted via the user device 102.

As discussed in more detail elsewhere herein, the system 101 can analyze the obtained data, including past gameplay data, data of a game element, and/or any other data (e.g., using statistical analysis, machine learning analysis, etc.), and generate a prediction for how a player will respond (e.g., positively, negatively, neutrally, etc.) to a particular game element. In some embodiments, the system 101 also provides interpretations, recommendations, notifications, or other information related to the obtained data and/or the generated predictions.

In some embodiments, the system 101 is configured to evaluate a game element and generate a prediction about a player's response to the game element using one or more machine learning models. The machine learning models can include supervised learning models, unsupervised learning models, semi-supervised learning models, and/or reinforcement learning models. Examples of machine learning models suitable for use with the present technology include, but are not limited to: regression algorithms, instance-based algorithms, regularization algorithms, decision tree algorithms, Bayesian algorithms, clustering algorithms, association rule learning algorithms, artificial neural networks, deep learning algorithms (e.g., convolutional neural networks, recurrent neural networks, long short-term memory networks, stacked autoencoders, deep Boltzmann machines, deep belief networks, transformers, language models), dimensionality reduction algorithms, time series forecasting algorithms, and ensemble algorithms.

The system 101 and user device 102 can be operably and communicatively coupled to each other via the network 106. The network 106 can be or include one or more communications networks and can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof. Additionally, although FIG. 1 illustrates the system 101 as being directly connected to the database 104 without the network 106, in other embodiments the system 101 can be indirectly connected to the database 104 via the network 106. Additionally, or alternatively, one or more of the user devices 102 can be configured to communicate directly with the system 101 and/or database 104, rather than communicating with these components via the network 106.

The various components illustrated in FIG. 1 (e.g., the system 101, user device 102, database 104, network 106) can include any suitable combination of hardware and/or software. In some embodiment, these components can be disposed on one or more computing devices, such as, server(s), database(s), personal computer(s), laptop(s), cellular telephone(s), smartphone(s), tablet computer(s), and/or any other computing devices and/or any combination thereof. In some embodiments, these components can be disposed on a single computing device and/or can be part of a single communications network. In some embodiments, the components can be located on distinct and separate computing devices.

As previously noted, the system 101 can be used to evaluate a videogame and generate predictions about how a player will respond to certain game elements within the videogame. In some embodiments, a user provides the system 101 with input data on a videogame via the user device 102. The input data can include one or more game elements that the user would like the system 101 to evaluate and generate a prediction on. Once this input data is received by the system 101, the system 101 can utilize one or more machine learning models to evaluate the input data, generate a prediction about how a player will respond to a game element, and output the prediction to the user via the user device 102.

Figure 2A:
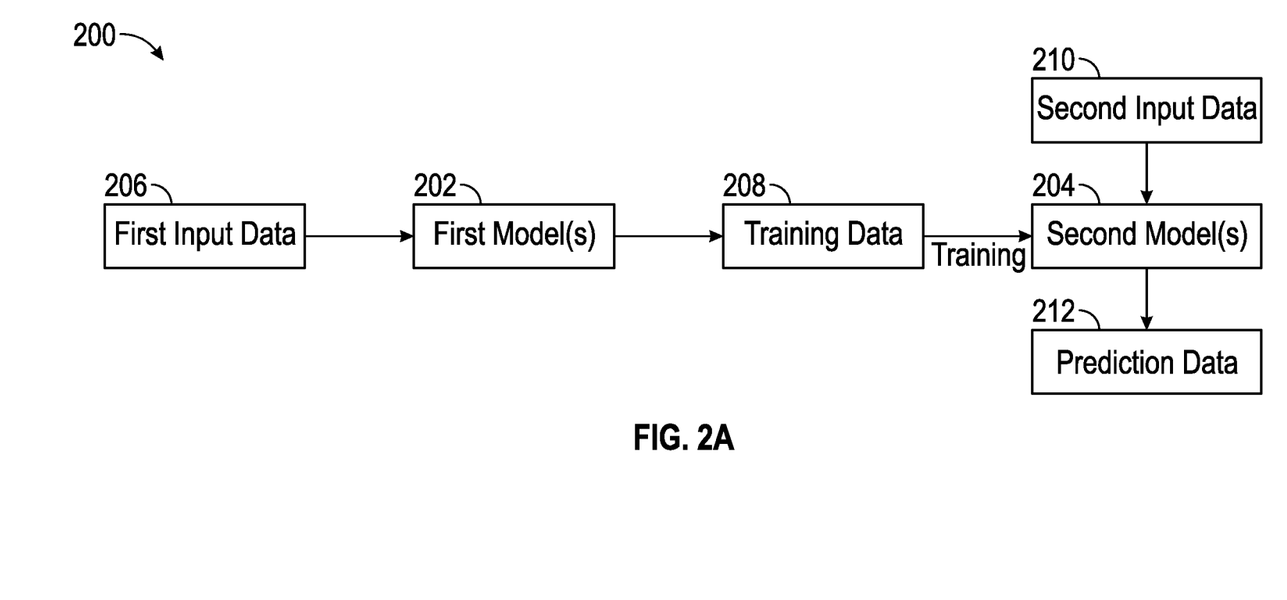
FIG. 2A is a block diagram schematically illustrating a machine learning architecture for evaluating a game element in accordance with embodiments of the present technology.

FIG. 2A is a block diagram schematically illustrating a machine learning architecture 200 ("architecture 200") for evaluating a game element, in accordance with embodiments of the present technology. The architecture 200 can be implemented across any desired software and/or hardware components by any of the systems and devices described herein, such as the system 101 and/or user devices 102 of FIG. 1. As illustrated in FIG. 2A, the architecture 200 includes a first set of machine learning models or algorithms 202 ("first model(s) 202") and a second set of machine learning models or algorithms 204 ("second model(s) 204"). The first model(s) 202 can be configured to receive and process first input data 206 (e.g., gameplay data) to generate training data 208 (e.g., event-response pairs) for training the second model(s) 204. Once trained, the second model(s) 204 can be configured to receive second input data 210 (e.g., data describing a game element) and generate prediction data 212 (e.g., a prediction of a player response to the game element).

The first model(s) 202 can include one or more machine learning models that are configured to automatically process the first input data 206 to produce training data for the second model(s) 204. In some embodiments, the first input data 206 includes gameplay data obtained while one or more players are playing a videogame. For example, the gameplay data can include recordings of a videogame, such as screen recordings, player video recordings, player audio recordings, or any other data showing gameplay events, player actions, and/or player responses during gameplay. The first input data 206 can also include data about the videogame, such as a textual description of a game element, a textual description of the genre of the videogame (e.g., first person shooter, sports game, strategy game), information regarding whether the videogame is a single player game or a multi-player game, etc. In some embodiments, the first input data 206 includes data from a plurality of different players playing a videogame. Alternatively, the first input data 206 can include data from a single player playing the videogame. The first input data 206 can include data from multiple videogames or can include data from a single videogame. In embodiments where the architecture 200 is used to predict how players will respond to a new game element that is being evaluated for potential inclusion in a videogame, the first input data 206 can include data from the same videogame (e.g., a version of the videogame without the new game element). Alternatively, or in combination, the first input data 206 can include data from other videogames (e.g., other videogames from the same or a similar genre as the videogame in which the new game element is to be implemented).

In some embodiments, the first model(s) 202 process the first input data 206 to generate training data 208. In some embodiments, the training data 208 includes a representation (e.g., a textual representation) of what events occurred during the gameplay in the first input data 206 (e.g., actions taken by the player, actions taken by the computer that affect the player). In some embodiments, the training data 208 includes a representation (e.g., a numerical representation) of a player's response to the gameplay in the first input data 206 (e.g., the emotions exhibited by the player in response to the events that occurred, such as positive, negative, neutral, etc.). The first model(s) 202 can output the training data 208 as one or more event-response pairs, each event-response pair including a gameplay event and a player response associated with the gameplay event. For example, an event-response pair can include the textual description "player picks up loot" and a response score of 0.8 that represents a positive player response. Additional details of how the first model(s) 202 process the input data 206 to generate the event-response pairs are provided further below.

In some embodiments, the second model(s) 204 include one or more machine learning models trained on the training data 208 to predict how a player will respond to a game element within a videogame. For example, the second model(s) 204 can include a deep learning model such as a convolutional neural network. In some embodiments, the second model(s) 204 are trained to determine a correlation or mapping between gameplay events and player responses, and use the correlation to accurately predict how players will respond to a new game element. For example, the event-response pairs generated by the first model(s) 202 can be used to train the second model(s) 204, in accordance with supervised learning techniques known to those of skill in the art.

Once trained, the second model(s) 204 can process second input data 210 to generate one or more predictions about how a player will respond to a game element. In some embodiments, the second input data 210 includes a data set representing one or more game elements (e.g., a textual description of the game element). The second model(s) 204 can produce prediction data 212 representing a prediction of how players will respond to the game element(s) represented in the second input data 210. For example, the prediction data 212 can include a binary output (e.g., 1 or 0) which represents whether a player will respond positively (e.g., 1) or negatively (e.g., 0) to a game element. As another example, the prediction data 212 can include a percentage (e.g., 52%, 0.52, etc.) which represents the probability that a player will respond positively or negatively to a game element. In a further example, the prediction data 212 can include a score or value (e.g., a decimal value from −1 to 1) representing whether a player is predicted to respond positively (e.g., a positive score), negatively (e.g., a negative score), or neutrally (e.g., a score of zero) to the game element. In some embodiments, the prediction data 212 can include suggested changes to the videogame (e.g., modifying the game element(s) included in the second input data 210 and/or another game element, adding another game element, etc.) that are predicted to maximize (or increase) the probability that players will respond positively to the game element(s). Additional details of the prediction data 212 that can be produced by the second model(s) 204 are provided further below.

Figure 2B:
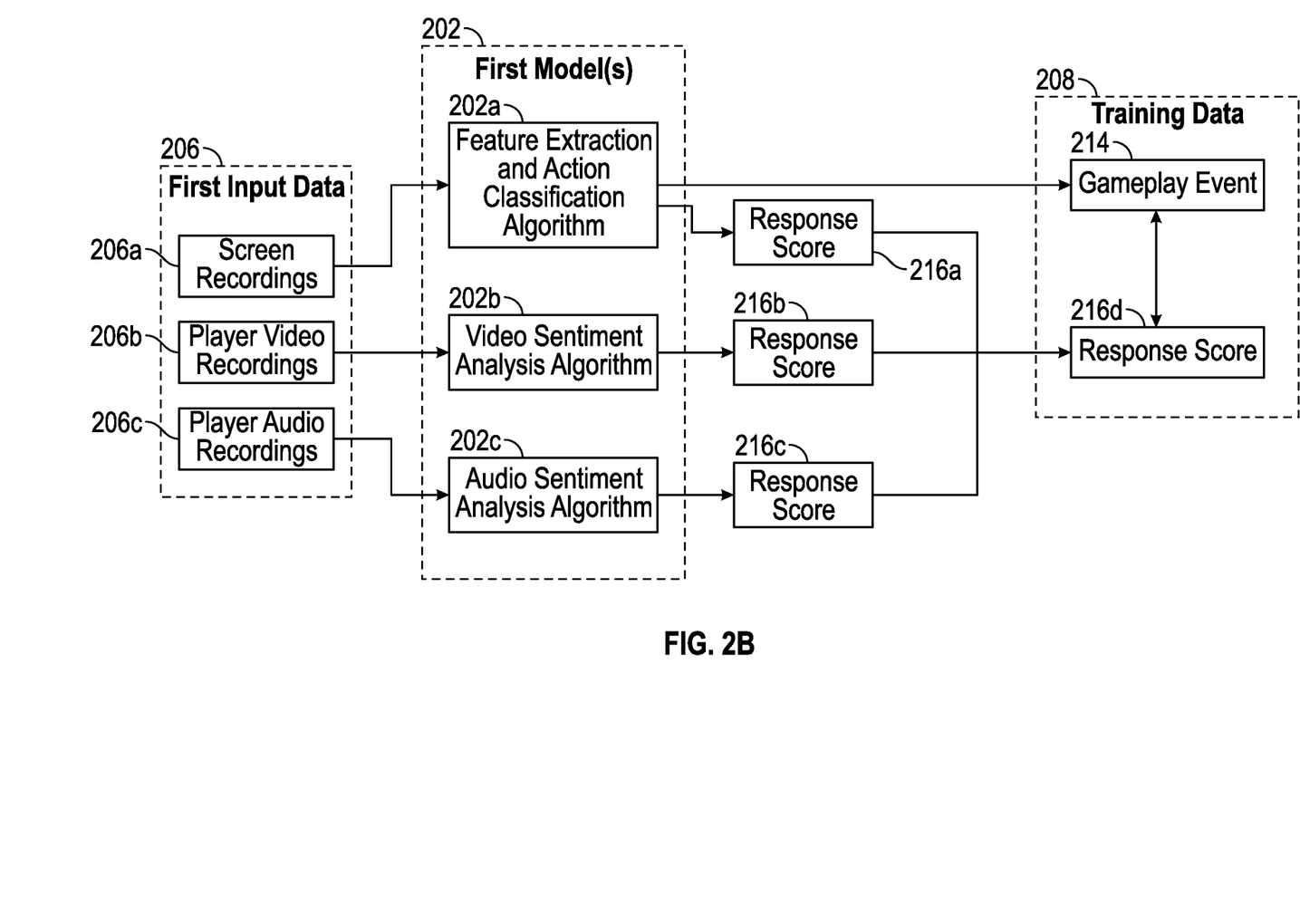
FIG. 2B is a block diagram schematically illustrating an example process for generating training data in accordance with embodiments of the present technology.

FIG. 2B is a block diagram schematically illustrating an example process for generating the training data 208 from the first input data 206 using the first model(s) 202, in accordance with embodiments of the present technology. As illustrated in FIG. 2B, the first input data 206 can include gameplay data from a variety of different sources. For example, the first input data 206 can include screen recordings 206a of gameplay (e.g., data of screen recordings or captures of the videogame), player video recordings 206b during gameplay (e.g., video data of a player's face and/or body while playing the videogame), player audio recordings 206c during gameplay (e.g., audio data of a player's voice while playing the videogame), and/or other gameplay related inputs. In other embodiments, however, any of the input data types shown in FIG. 2B can be omitted or substituted with other types of input data. Additionally, some of the input data types shown in FIG. 2B can be combined with each other (e.g., the player video recordings 206b may be combined with the player audio recordings 206c).

The first model(s) 202 can include a plurality of machine learning models or algorithms for processing the first input data 206 to generate the training data 208. In the illustrated embodiment, for example, each input data type is processed by a different respective algorithm; for example, the first model(s) 202 include a first algorithm (e.g., a feature extraction and action classification algorithm 202a) for processing the screen recordings 206a, a second algorithm (e.g., a video sentiment analysis algorithm 202b) for processing the player video recordings 206b, and a third algorithm (e.g., an audio sentiment analysis algorithm 202c) for processing the player audio recordings 206c. In other embodiments, however, some or all of the input data types can be processed by the same algorithm (e.g., the player video recordings 206b and player audio recordings 206c can be processed by a single sentiment analysis algorithm configured to analyze both video and audio data). Additionally or alternatively, some or all of the input data types can be processed by multiple algorithms (e.g., the first model(s) 202 can include multiple algorithms for processing different aspects of the screen recordings 206a).

In some embodiments, the first model(s) 202 include a first set of models or algorithms configured to identify one or more gameplay events 214 from the input data 206. Each gameplay event 214 can be a description or representation of an event (e.g., a player action, computer action) that occurred during gameplay. For example, the feature extraction and action classification algorithm 202a can process the screen recordings 206a to (a) determine when a gameplay event has occurred (e.g., when a player moves in-game, when a player achieves an objective in-game, when an event occurs in-game, etc.) and/or (b) classify what event occurred (e.g., generating a text string describing the gameplay event). The feature extraction and action classification algorithm 202a can be any machine learning algorithm configured to analyze video data to identify and label various events that occurred in the video data, such as the VideoBERT model for video representation learning.

In some embodiments, the feature extraction and action classification algorithm 202a recognizes images from the screen recordings 206a and/or detects frame-to-frame changes to determine what gameplay events 214 are occurring within the screen recording 206a. In some embodiments, the feature extraction and action classification algorithm 202a is configured to produce gameplay events 214 of a desired level of significance. For example, the feature extraction and action classification algorithm 202a can determine that a gameplay event 214 has occurred whenever any change in the game occurs (e.g., when an in-game character is moved, when a game level is changed, etc.). As another example, the feature extraction and action classification algorithm 202a can determine that a gameplay event 214 has occurred whenever a significant change in the game occurs (e.g., when a player completes an objective in-game, when a player defeats an enemy, etc.). The feature extraction and action classification algorithm 202a can output a description or representation of one or more gameplay events 214 that occurred in the screen recordings 206a. In some embodiments, each gameplay event 214 is represented as a text string that describes the event that has occurred within the videogame (e.g., "player defeats monsters," "player picks up loot"). Alternatively, or in combination, the gameplay event 214 can be represented using other types of data formats.

The first model(s) 202 can also include a second set of models or algorithms configured to identify one or more player responses that are associated with the gameplay event 214. In the illustrated embodiment, the first model(s) are configured to determine a plurality of response scores 216a—c for each of the different input types, which are then combined to generate the final response score 216d for the gameplay event, as described in greater detail below. The response scores 216a—d (collectively, "response scores 216") can each represent a player's response to the gameplay event 214 (e.g., emotional response, physical response, etc.). In some embodiments, the response scores 216 are numerical values (e.g., −1 to 1) representing a type of response to a gameplay event 214 (e.g., positive response, negative response, neutral response, etc.). Alternatively, or in combination, the player responses can be represented using other types of data formats (e.g., text strings).

In some embodiments, the response scores 216a—c all correspond to a single gameplay event 214. For instance, the gameplay event 214 identified from the first input data 206 can be associated with a particular time point or interval corresponding to a particular gameplay period. Subsequently, the first model(s) 202 can analyze the screen recording 206a, the player video recording 206b, and the player audio recording 206c during the same time point or interval as the gameplay event 214 to generate the corresponding response scores 216a—c for that gameplay event 214. In the embodiment of FIG. 2B, the first model(s) 202 includes three separate algorithms for generating the response scores 216 from the different input data types: the feature extraction and action classification algorithm 202a generates the response score 216a from the screen recordings 206a, a video sentiment analysis algorithm 202b generates the response score 216b from the player video recordings 206b, and an audio sentiment analysis algorithm 202c generates the response score 216c from the player audio recordings 206c. Each of these algorithms is discussed in detail below.

The feature extraction and action classification algorithm 202a can evaluate the screen recordings 206a to identify gameplay events that are indicative of a particular player response. For example, the feature extraction and action classification algorithm 202a can generate the response score 216a by analyzing one or more of the following events: if the player follows a "hot path" (e.g., an in-game action or route that is commonly used among players, which may be indicative of a positive response), if the player follows a "cold path" (e.g., an in-game action or route that is not commonly used among players, which may be indicative of a negative response), if the player experiences a "frozen moment" (e.g., when the player does not perform any actions for a period of time, which may be indicative of a negative response), user interface (UI) and/or user experience (UX) interactions (e.g., how long it takes for the player to figure out which user interface feature is needed to perform an action; longer interactions may be indicative of a negative response), and/or other in-game indicators to determine a player's response to the specific gameplay event 214. Alternatively, or in combination, the response score 216a can be generated by a different algorithm than the feature extraction and action classification algorithm 202a, or the response score 216a can be omitted altogether.

The video sentiment analysis algorithm 202b can analyze the player video recordings 206b to determine the player's response to the gameplay event 214. For example, the video sentiment analysis algorithm 202b can analyze a player's facial expressions and/or body language (e.g., gestures, posture) in one or more image frames of the player video recordings 206b to determine when a player is happy, sad, bored, angry, etc. Alternatively, or in combination, the first model(s) 202 can implement other techniques for determining the response score 216b from the player video recordings 206b. For example, the player video recordings 206b can be converted into text data that describes the player's actions while playing the videogame (e.g., "player is smiling"), and a textual sentiment analysis algorithm can analyze the text data to determine the player's response (e.g., player is happy). Subsequently, the video sentiment analysis algorithm 202b can output the response score 216b, which represents the player's response as determined from the player video recordings 206b.

The audio sentiment analysis algorithm 202c can be configured to analyze the player audio recordings 206c to determine the player's response to the gameplay event 214. For example, the audio sentiment analysis algorithm 202c can analyze the player's speech (e.g., the content and/or tone of the speech) to recognize when a player is happy, sad, bored, angry, etc. In some embodiments, the audio sentiment analysis algorithm 202c directly analyzes the player audio recordings 206c. In other embodiments, the player audio recordings 206c are first transcribed into text data (e.g., using speech-to-text programs or algorithms), and the audio sentiment analysis algorithm 202c analyzes the text data to determine the player's response. Subsequently, the audio sentiment analysis algorithm 202c can output the response score 216c which represents the player's response as determined from the player audio recordings 206c.

Subsequently, the response scores 216a—c can be combined and outputted as a single response score 216d representing the player's overall response across all of the first input data 206 (e.g., across the screen recordings 206a, player video recordings 206b, and player audio recordings 206c, or some combination thereof). The response scores 216a—c can be combined in various ways to generate the final response score 216d, such as by summing, averaging, or other suitable techniques. In some embodiments, the final response score 216d is a weighted average of the individual response scores 216a—c, with each of the individual response scores 216a—c being assigned a respective weight parameter. For example, the response score 216a can be assigned a first weight parameter, the response score 216b can be assigned a second weight parameter, and the response score 216c can be assigned a third weight parameter. The weight parameters can be assigned to each response score 216a—c so that the final response score 216d can more accurately reflect the player's actual response to a particular gameplay event 214. For example, a higher weight parameter can be assigned to response scores generated from input data types that are more likely to accurately represent the player's response, while a lower weight parameter can be assigned to response scores generated from input data types that are less likely to accurately represent the player's response.

In some embodiments, the weight parameters will vary depending on whether the first input data 206 depicts gameplay occurring in a single player game or a multiplayer game. For example, for a multiplayer game, the weight parameter assigned to the response score 216c generated from the player audio recordings 206c can be higher than the weight parameters for other input data types, since player audio recordings 206c may provide more information on player emotion in a multiplayer setting. For example, multiplayer games can involve more speech-based interactions, more speakers, and/or more speaking time and/or content than a single player game. In contrast, player audio recordings 206c may be less informative in a single player setting and thus may be weighted the same or less than the other input data types.

Once the final response score 216d has been determined, it can be linked or otherwise associated with the gameplay event 214 to produce an event-response pair. The event-response pair can be part of the training data 208 generated by the first model(s) 202. Although FIG. 2B illustrates a single event-response pair, this is merely for purposes of simplicity. The training data 208 can include a plurality of event-response pairs generated from the input data 206, such as at least tens, hundreds, thousands, tens of thousands, or hundreds of thousands of event-response pairs. In such embodiments, the processes described herein can be repeated multiple times to identify a plurality of distinct gameplay events 214 that occur during the gameplay period in the first input data 206, and then determine the response score 216d for each identified gameplay event 214. The event-response pairs can then be used to train the second model(s) 204 of FIG. 2A, as discussed in greater detail below.

The implementation shown in FIG. 2B can be modified in many different ways, if desired. For example, although the illustrated embodiment shows the gameplay event 214 being determined from the screen recordings 206a only, in other embodiments, the gameplay event 214 can alternatively or additionally be determined from other input data types, such as the player video recordings 206b and/or the player audio recordings 206c. Additionally, the gameplay event 214 can be determined using other types of algorithms besides the feature extraction and action classification algorithm 202a.

As another example, although the final response score 216d is illustrated as being determined from all three input data types, in other embodiments, the final response score 216d can be determined from only a subset of the first input data 206 (e.g., one or more of the response scores 216a—c can be omitted). Any of the algorithms for determining the response scores 216a—c shown in FIG. 2B can be substituted with other algorithms (e.g., the response score 216a can be determined using a different algorithm than the feature extraction and action classification algorithm 202a) or combined with each other (e.g., a single sentiment analysis algorithm can be used to generate a single response score from the player video recordings 206b and the player audio recordings 206c).

In yet another example, although the gameplay event 214 is depicted as being associated with a single response score 216d, in other embodiments, a single gameplay event 214 can be associated with multiple response scores 216, or multiple gameplay events 214 can be associated with a single response score 216. Thus, any reference herein to an "event-response pair" can also refer to a training sample including any suitable number of gameplay events 214 associated with any suitable number of corresponding response scores 216.

Figure 3A:
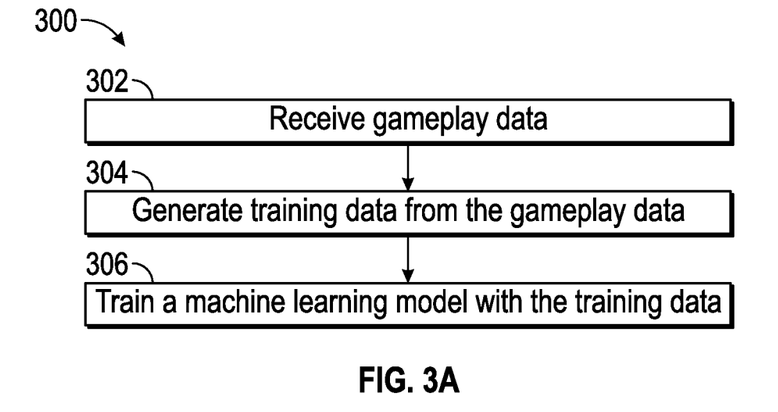
FIG. 3A illustrates an example method for training a machine learning model to evaluate a game element in accordance with embodiments of the present technology.

FIG. 3A is a block diagram illustrating a method 300 for training a machine learning model to evaluate a game element, in accordance with embodiments of the present technology. The method 300 can be performed by any embodiment of the systems and devices described herein, such as by a computing system or device including one or more processors and a memory storing instructions that, when executed by the one or more processors, cause the computing system or the device to perform some or all of the steps described herein. For example, any of the steps of the method 300 can be performed by the system 101 and/or the user device 102 of FIG. 1.

The method 300 starts at step 302 with receiving gameplay data. The gameplay data can be uploaded and/or inputted into a computing system or device (e.g., the system 101 of FIG. 1), such as manually by a user (e.g., a game developer), automatically (e.g., automatically pushed when new input data is available), or suitable combinations thereof. The gameplay data can include screen recording data (e.g., the screen recordings 206a of FIG. 2B), player video data (e.g., the player video recordings 206b of FIG. 2B), player audio data (e.g., the player audio recordings 206c of FIG. 2B), and/or any of the other input data types described elsewhere herein. The gameplay data can be from a single videogame or from multiple videogames. Additionally, the gameplay data can be from a single player or from multiple players. In some embodiments, the gameplay data is from the same videogame where the game element is to be implemented (e.g., a version of the videogame without the new game element). Alternatively, or in combination, the gameplay data can be from other videogames (e.g., other videogames from the same or a similar genre as the videogame in which the new game element is to be implemented).

At step 304, the method 300 continues with generating training data from the gameplay data of step 302. In some embodiments, step 304 includes processing the gameplay data using one or more machine learning models (e.g., the first model(s) 202 of FIGS. 2A and 2B) to produce the training data. The training data can be generated from the gameplay data in a semi-automated or fully automated manner, such that large volumes of gameplay data can be quickly processed into a format suitable for training with little or no human intervention.

Figure 3B:
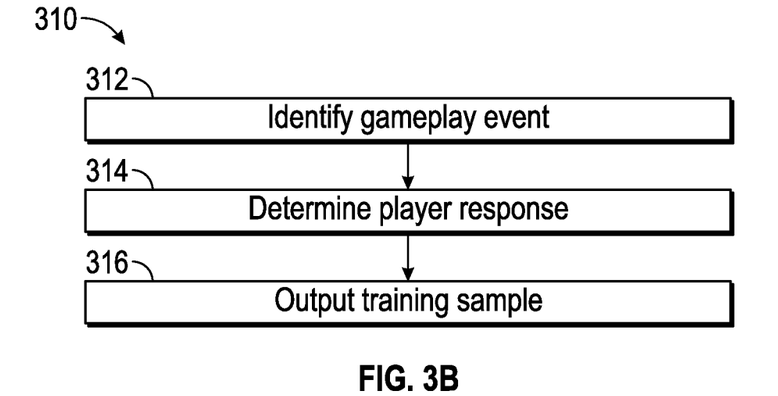
FIG. 3B illustrates an example method for generating a training sample from gameplay data in accordance with embodiments of the present technology.

FIG. 3B is a block diagram illustrating an example method 310 for generating training data from gameplay data, in accordance with embodiments of the present technology. The method 310 can performed as part of step 304 of the method 300 of FIG. 3A. The method 310 begins at step 312, with identifying at least one gameplay event in the gameplay data. As discussed above, the gameplay event can be a description or representation of an event (e.g., a player action, computer action) that occurred during the gameplay period of the input data. The gameplay event can be identified by using a first set of machine learning models (e.g., the feature extraction and action classification algorithm 202a of FIG. 2B). The model(s) can analyze the various input data (e.g., the screen recording data, player video data, and/or player audio data) to determine what type of gameplay event occurred and when. For example, step 312 can include identifying at least one gameplay event that occurred during a gameplay period captured in the screen recording data. In some embodiments, the model(s) output a textual representation (e.g., a text string) describing the identified gameplay event.

At step 314, the method 310 can include determining a player response associated with the gameplay event identified in step 312. The player response can be a positive response (e.g., a positive emotion such as happiness, excitement, etc.), a neutral response, or a negative response (e.g., a negative emotion such as boredom, dislike, anger, etc.). The player response can be identified by using a second set of machine learning models (e.g., the feature extraction and action classification algorithm 202a, video sentiment analysis algorithm 202b, and/or audio sentiment analysis algorithm 202c of FIG. 2B) to analyze the various input data (e.g., the screen recording data, player video data, and/or player audio data) at or near the time period when the gameplay event occurred. In some embodiments, step 314 includes generating a response score representing the player response. As previously discussed, the response score can be a numerical value representing the player response. In some embodiments, step 314 includes generating a response score for each type of input data, and then combining the individual response scores to generate the final response score. The combining process can include assigning weight parameters to the individual response scores before combining the individual response scores into a single overall response score.

At step 316, the method 310 can include outputting a training sample. The training sample can include the gameplay event of step 312 and the player response (e.g., overall response score) of step 314. In some embodiments, steps 312 and 314 of the method 310 are performed multiple times to generate a plurality of training samples from the input data, each training sample including at least one gameplay event and at least one associated player response. The training samples can be combined to generate the training data.

Referring again to FIG. 3A, once the training data has been generated, the method 300 can continue at step 306 with training a machine learning model on the training data. The machine learning model can be or include any of the models described herein, such as the second model(s) 204 of FIG. 2A. In some embodiments, the machine learning model is a deep learning model (e.g., a convolutional neural network). As previously discussed, the machine learning model can be trained on the training data to determine a correlation or mapping between gameplay events and player responses. Once trained, the machine learning model can use the correlation to accurately predict how players will respond to a new game element.

Figure 4:
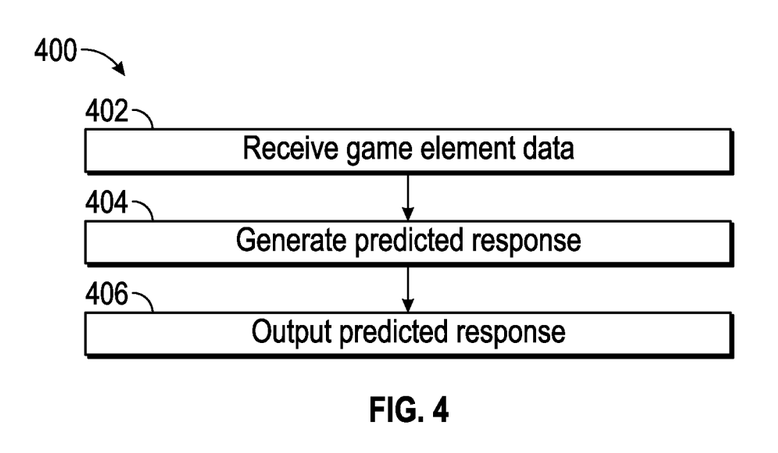
FIG. 4 illustrates an example method for evaluating a game element in accordance with embodiments of the present technology.

FIG. 4 is a block diagram illustrating a method 400 for evaluating a game element, in accordance with embodiments of the present technology. The method 400 can be performed by any embodiment of the systems and devices described herein, such as by a computing system or device including one or more processors and a memory storing instructions that, when executed by the one or more processors, cause the computing system or the device to perform some or all of the steps described herein. For example, any of the steps of the method 400 can be performed by the system 101 and/or the user device 102 of FIG. 1.

The method 400 begins at step 402 with receiving game element data. The game element data can be any data set that describes or represents the game element to be evaluated. For example, the game element can be a new feature of a videogame such as a game item, game mechanic, etc. The game element data can be provided in any suitable format, such as a text string. In some embodiments, a user (e.g., game developer) generates a textual description of the new game element (e.g., "a new weapon type") and transmits the description to the system 101 of FIG. 1 directly or via a user device 102.

At step 404, the method 400 continues with generating a predicted response to the game element, using at least one trained machine learning model (e.g., the second model(s) 204 of FIG. 2A). The machine learning model can be trained in accordance with any of the techniques described herein, such as the methods 300 and 310 of FIGS. 3A and 3B, respectively. For example, the machine learning model can be trained on event-response pairs generated from previous gameplay data (e.g., of the same videogame for which the prediction is to be made and/or of a different videogame of a similar genre).

In some embodiments, the machine learning model receives the game element data (e.g., the text string) as input, and outputs a prediction of a player's emotional response to the game element. In some embodiments, the prediction indicates whether a player is likely to experience a positive emotion, a negative emotion, or a neutral emotion in response to the game element. The prediction can be provided in any suitable format, such as a binary value (e.g., 0=dislike, 1=like), a range of values (e.g., a decimal value between −1 and 1 inclusive, where negative values indicate dislike, 0 indicates neutrality, and positive values indicate like), a probability value (e.g., indicating the likelihood the player will like the game element), a text string (e.g., "like," "dislike," "excitement," "boredom"), or a combination thereof.

Optionally, the predicted response can include one or more suggestions, recommendations, etc., that are predicted to increase the likelihood that the player will respond positively to the game element. For example, the machine learning model can determine at least one additional game element that, when combined with or substituted for the game element being evaluated, will increase the likelihood of a positive player response. As another example, the machine learning model can determine one or more changes to an existing game element that, when combined with or substituted for the game element being evaluated, will increase the likelihood of a positive player response. In some embodiments, the machine learning model first determines a probability that a player will respond positively to the game element. Subsequently, the machine learning model can evaluate the change in probability when an additional game element is introduced and/or if a change is made to an existing game element. For example, the machine learning model can first determine that there is a 77% chance that players will respond positively to a new game element and can then determine that the probability would increase to 90% if the new game element is combined with an adjustment to an existing game element. The machine learning model can then select the approach that would maximize or otherwise produce the greatest increase in the probability of a positive player response. In some embodiments, the machine learning model can (1) output the initial probability of how a player will respond to the game element, (2) output at least one additional game element and/or adjusted game element that improves the predicted response, and (3) output the new probability of how a player will respond to the new game element when combined with the additional and/or adjusted game element.

At step 406, the method 400 can include outputting the predicted response. The predicted response can be outputted to one or more user devices associated with a game developer (e.g., the user device 102 of FIG. 1) and/or stored in a database (e.g., the database 104 of FIG. 1).

EXAMPLES

The following examples are included to further describe some aspects of the present technology and should not be used to limit the scope of the technology.

Example 1: Generating an Event-Response Pair from Input Data

An example of a game evaluation system generating an event-response pair will now be described. In this example, the system receives input data from a user device. The input data includes gameplay data of a 40 second screen recording of the videogame, a corresponding 40 second video recording of the player's face while playing the videogame, and a corresponding 40 second voice recording of the player during gameplay. In the screen recording, the player's character defeats an enemy and then proceeds to move to the defeated enemy's position to collect loot dropped by the enemy. In the corresponding video recording, the player can be seen jumping up from her chair when the enemy is defeated and can later been seen leaning forward in her chair as she collects the loot from the enemy. In the corresponding voice recording, the player is recorded saying, "Yes! I got a new record!" when she defeats the enemy but is silent when collecting the loot from the enemy.

After the system receives the input data, the system processes the inputs by evaluating the input data with a feature extraction and action classification algorithm. The feature extraction and action classification algorithm determines that two gameplay events have occurred within the screen recording, which are (1) player defeats enemy and (2) player collects loot. The feature extraction and action classification algorithm generates two text strings that correspond to the gameplay events, the first gameplay event having the text string "player defeats enemy" and the second gameplay event having the text string "player collects loot."

After the system evaluates the input data with the feature extraction and action classification algorithm to identify the gameplay events, the system then proceeds to evaluate the input data to generate a response score for each gameplay event. During this phase, the system analyzes the different types of input data and assigns a response score that has a numerical value between −1 and 1, where negative values represent a negative response, positive values represent a positive response, and 0 represents a neutral response.

The system first evaluates the screen recording with the feature extraction and action classification algorithm. The algorithm determines that the player followed a hot path when defeating an enemy and followed a second, more popular hot path when proceeding to collect the loot. As a result, the algorithm generates a response score of 0.8 for the first gameplay event and a response score of 0.9 for the second gameplay event.

The system then evaluates the player video recording with the video sentiment analysis algorithm. The algorithm determines that the player cheered after defeating the enemy and that the player was engaged in the game while collecting the loot. Accordingly, the algorithm generates a response score of 1.0 for the first gameplay event and a response score of 0.5 for the second gameplay event.

The system then evaluates the player voice recording with the audio sentiment analysis algorithm. The algorithm determines that the player was excited after defeating the enemy and that the player was neutral while collecting the loot. Accordingly, the algorithm generates a response score of 1.0 for the first gameplay event and a response score of 0.0 for the second gameplay event.

After the system has generated the response scores for the different types of input data, the system then proceeds to combine the response scores into a single final response score for each gameplay event. In this example, the system does not weigh any type of input data more heavily than the other. As a result, the weight parameters assigned to each response score are equal. For the first gameplay event ("player defeats enemy"), the response scores (0.8, 1.0, 1.0) are each multiplied by a weight parameter of 0.333 and then are added together, resulting in a combined response score of 0.93. For the second gameplay event ("player collects loot"), the response scores (0.9, 0.5, 0.0) are each multiplied by a weight parameter of 0.333 and then are added together, resulting in a combined response score of 0.47.

After the system has generated the combined response scores, the system joins the combined response scores with their corresponding gameplay events and outputs two event-response pairs: ("player defeats enemy", 0.93) and ("player collects loot", 0.47).

Example 2: Predicting Player Response to a New Game Element

An example of the system generating a prediction about a game element will now be described. In this example, a game developer wants to determine whether the players of her videogame will respond positively to a new game item, an iron cart. To generate a prediction about how a player will respond to an iron cart being added into the videogame, the game developer can send a query to the system. The query can include what prediction the game developer would like generated (e.g., binary prediction, probability prediction, etc.) and a textual description of the game element. Accordingly, in this example, the game developer requests that the system generate a probability prediction for "including an iron cart." The game developer also requests that the system provide any suggested changes to the videogame to increase the probability that users will respond positively to the iron cart.

In response to the query, the system inputs the text string "including an iron cart" into a machine learning model that has been trained on gameplay data from a version of the game developer's videogame without the iron cart. Specifically, the model has been trained to determine a mapping between events that occur in the game and player response scores. The model determines that players would have a 70% chance of responding positively to the new iron cart item. Additionally, the model further determines that changing the videogame to make iron easier to obtain would increase the probability that player would respond positively to the game element from 70% to 94%. After the model generates these predictions, the model outputs the initial 70% probability prediction, a textual description of the change to the videogame (e.g., "make iron easier to obtain"), and the second probability prediction of 94%.

Additional Examples

Several aspects of the present technology are set forth in the following examples.

1. A method for evaluating a game element, the method comprising:
   receiving a data set representing the game element; and
   generating a predicted response to the game element by inputting the data set into a machine learning model, wherein the machine learning model is trained on a plurality of training samples derived from previous gameplay data, each training sample including a gameplay event and a player response associated with the gameplay event.

2. The method of example 1, wherein the data set comprises a text string representing the game element.

3. The method of example 1 or 2, wherein the predicted response comprises a numerical value representing a probability that a player will like the game element.

4. The method of any one of examples 1-3, wherein the predicted response indicates whether a player is likely to experience a positive emotion, a negative emotion, or a neutral emotion in response to the game element.

5. The method of any one of examples 1-4, further comprising determining, using the machine learning model, at least one additional game element that improves the predicted response.

6. The method of any one of examples 1-5, wherein the machine learning model comprises a deep learning model.

7. The method of any one of examples 1-6, wherein the game element is being evaluated for potential inclusion in a game, and wherein the previous gameplay data comprises gameplay data of the game without the game element.

8. The method of any one of examples 1-7, wherein the game element is being evaluated for potential inclusion in a game, and wherein the previous gameplay data comprises gameplay data of a different game.

9. The method of any one of examples 1-8, wherein the previous gameplay data includes one or more of player video data, player audio data, or screen recording data.

10. The method of example 9, wherein the training samples are generated by:
    identifying a gameplay event that occurred during a gameplay period captured in the screen recording data; and
    determining a player response associated with the gameplay event based on one or more of the player video data, player audio data, or screen recording data.

11. The method of example 10, wherein the gameplay event is identified using a feature extraction and action classification algorithm.

12. The method of example 11, wherein the feature extraction and action classification algorithm is configured to output a text string representing the gameplay event.

13. The method of any one of examples 10-12, wherein determining the player response includes analyzing the player video data using a sentiment analysis algorithm.

14. The method of any one of examples 10-13, wherein determining the player response includes analyzing the player audio data using a sentiment analysis algorithm.

15. The method of any one of examples 10-14, wherein determining the player response includes:
    converting the player audio data into text data; and
    analyzing the text data using a sentiment analysis algorithm.

16. The method of any one of examples 10-15, wherein determining the player response includes analyzing the screen recording data to identify one or more of the following: a hot path, a cold path, a frozen moment, a user interface interaction, or a user experience interaction.

17. The method of any one of examples 10-16, wherein determining the player response includes:
    generating a first response score based on the player video data;

generating a second response score based on the player audio data;

generating a third response score based on the screen recording data; and combining at least two of the first, second, or third response scores.

18. The method of example 17, wherein the first, second, and third response scores are each assigned a respective weight parameter.

19. The method of example 18, wherein the respective weight parameter of one or more of the first, second, or third response scores varies depending on whether the gameplay period occurred in a single player game or a multiplayer game.

20. A system for evaluating a game element, the system comprising:

a processor; and a memory operably coupled to the processor and storing instructions that, when executed by the processor, cause the system to perform operations comprising:

inputting data representing the game element into a deep learning model, wherein the deep learning model is trained on a plurality of training samples generated from previous gameplay data, each training sample including a gameplay event and an associated with the gameplay event; and generating a prediction of a player response to the game element using the deep learning model.

21. The method of example 20, wherein the data representing the game element comprises a text string.

22. The method of example 20 or 21, wherein the prediction of the player response comprises a numerical value representing a probability that a player will like the game element 23. The method of any one of examples 20-22, wherein the prediction of the player response indicates whether a player is likely to experience a positive emotion, a negative emotion, or a neutral emotion in response to the game element.

24. The method of any one of examples 20-23, wherein the game element is a first game element, and wherein the operations further comprise determining, using the deep learning model, a second game element that, when modified, improves the prediction of the player response to the first game element 25. The method of any one of examples 20-24, wherein the deep learning model is configured to evaluate the game element for potential inclusion in a game, and wherein the previous gameplay data comprises gameplay data of the game without the game element.

26. A non-transitory computer-readable storage medium comprising instructions that, when executed by one or more processors of a computing system, cause the computing system to perform operations comprising:

receiving a data set representing a game element; and predicting a player response to the game element by inputting the data set into a machine learning model, wherein the machine learning model is trained on a plurality of training samples generated from previous gameplay data, each training sample including a gameplay event and a response score associated with the gameplay event.

27. A method for training a machine learning model to evaluate new game elements, the method comprising:

receiving gameplay data including one or more of player video data, player audio data, or screen recording data;

processing the gameplay data to generate a plurality of training samples, each training sample including a gameplay event and a player response associated with the gameplay event; and training the machine learning model using the plurality of training samples.

28. The method of example 27, wherein the gameplay data comprises data from a plurality of different players.

29. The method of example 27 or 28, wherein the gameplay data comprises data from a plurality of different games.

30. The method of any one of examples 27-29, wherein processing the gameplay data includes:

identifying a gameplay event that occurred during a gameplay period captured in the screen recording data; and determining a player response associated with the gameplay event based on one or more of the player video data, player audio data, or screen recording data.

31. The method of example 30, wherein the gameplay event is identified using a first set of machine learning models, and wherein the player response is determined using a second set of machine learning models.

32. The method of example 30 or 31, wherein the gameplay event is identified using a feature extraction and action classification algorithm.

33. The method of any one of examples 30-32, wherein the gameplay event is represented as a text string.

34. The method of any one of examples 30-33, wherein determining the player response includes analyzing the player video data using a sentiment analysis algorithm.

35. The method of any one of examples 30-34, wherein determining the player response includes analyzing the player audio data using a sentiment analysis algorithm.

36. The method of any one of examples 30-35, wherein determining the player response includes:

converting the player audio data into text data; and analyzing the text data using a sentiment analysis algorithm.

37. The method of any one of examples 30-36, wherein determining the player response includes analyzing the screen recording data to identify one or more of the following: a hot path, a cold path, a frozen moment, a user interface interaction, or a user experience interaction.

38. The method of any one of examples 30-38, wherein determining the player response includes:

generating a first response score based on the player video data;

generating a second response score based on the player audio data;

generating a third response score based on the screen recording data; and combining at least two of the first, second, or third response scores.

39. The method of example 38, wherein the first, second, and third response scores are each assigned a respective weight parameter.

40. The method of example 39, wherein the respective weight parameter of one or more of the first, second, or third response scores varies depending on whether the gameplay period occurred in a single player game or a multiplayer game.

41. The method of any one of examples 27-40, wherein the machine learning model is trained to determine a correlation between gameplay events and player emotions.

42. A system for training a machine learning model to evaluate new game elements, the system comprising:

a processor; and a memory operably coupled to the processor and storing instructions that, when executed by the processor, cause the system to perform operations comprising:

receiving gameplay data including one or more of player video data, player audio data, or screen recording data;

generating a plurality of training samples from the gameplay data, each training sample including a gameplay event and an emotion score associated with the gameplay event; and training the machine learning model using the plurality of training samples.

43. A non-transitory computer-readable storage medium comprising instructions that, when executed by one or more processors of a computing system, cause the computing system to perform operations comprising:

receiving gameplay data including one or more of player video data, player audio data, or screen recording data;

processing the gameplay data to generate a plurality of training samples, each training sample including a gameplay event and an emotion score associated with the gameplay event; and training a deep learning model using the plurality of training samples.

CONCLUSION

Although many of the embodiments are described above with respect to systems, devices, and methods for improving a videogame design, the technology is applicable to other applications and/or other approaches. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1-4.

The various processes described herein can be partially or fully implemented using program code including instructions executable by one or more processors of a computing system for implementing specific logical functions or steps in the process. The program code can be stored on any type of computer-readable medium, such as a storage device including a disk or hard drive. Computer-readable media containing code, or portions of code, can include any appropriate media known in the art, such as non-transitory computer-readable storage media. Computer-readable media can include volatile and non-volatile, removable and non-removable media implemented in any method or technology for storage and/or transmission of information, including, but not limited to, random-access memory (RAM), read-only memory (ROM), electrically erasable programmable read-only memory (EEPROM), flash memory, or other memory technology; compact disc read-only memory (CD-ROM), digital video disc (DVD), or other optical storage; magnetic cassettes, magnetic tape, magnetic disk storage, or other magnetic storage devices; solid state drives (SSD) or other solid state storage devices; or any other medium which can be used to store the desired information and which can be accessed by a system device.

The descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

As used herein, the terms "generally," "substantially," "about," and similar terms are used as terms of approximation and not as terms of degree, and are intended to account for the inherent variations in measured or calculated values that would be recognized by those of ordinary skill in the art.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. As used herein, the phrase "and/or" as in "A and/or B" refers to A alone, B alone, and A and B.

It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A computer-implemented method for evaluating a game element, the computer-implemented method comprising:

receiving, via one or more processors, a data set representing the game element; and generating, via one or more processors, a predicted response to the game element by inputting the data set into a neural network, wherein the neural network is trained on a plurality of training samples derived from previous gameplay data, each training sample including a gameplay event and a player response associated with the gameplay event, wherein the previous gameplay data includes one or more of player video data, player audio data, or screen recording data, and wherein the training samples are generated by:
identifying a gameplay event that occurred during a gameplay period captured in the screen recording data, and determining a player response associated with the identified gameplay event based on one or more of the player video data, the player audio data, or the screen recording data.

2. The computer-implemented method of claim 1, wherein the data set comprises a text string representing the game element.

3. The computer-implemented method of claim 1, wherein the predicted response comprises a numerical value representing a probability that a player will like the game element.

4. The compute-implemented method of claim 1, wherein the predicted response indicates whether a player is likely to experience a positive emotion, a negative emotion, or a neutral emotion in response to the game element.

5. The computer-implemented method of claim 1, further comprising determining, using the neural network, at least one additional game element that improves the predicted response.

6. The computer-implemented method of claim 1, wherein the neural network comprises a deep learning neural network.

7. The computer-implemented method of claim 1, wherein the game element is being evaluated for potential inclusion in a game, and wherein the previous gameplay data comprises gameplay data of the game without the game element.

8. The computer-implemented method of claim 1, wherein the game element is being evaluated for potential inclusion in a game, and wherein the previous gameplay data comprises gameplay data of a different game.

9. The computer-implemented method of claim 1, wherein the gameplay event is identified using a feature extraction and action classification algorithm.

10. The computer-implemented method of claim 9, wherein the feature extraction and action classification algorithm is configured to output a text string representing the gameplay event.

11. The computer-implemented method of claim 1, wherein determining the player response includes analyzing the player video data using a sentiment analysis algorithm.

12. The computer-implemented method of claim 1, wherein determining the player response includes analyzing the screen recording data to identify one or more of the following: a hot path, a cold path, a frozen moment, a user interface interaction, or a user experience interaction.

13. A system for evaluating a game element, the system comprising:
   a processor; and
   a memory operably coupled to the processors and storing instructions that, when executed by the processor, cause the system to perform operations comprising:
      inputting data representing the game element into a deep learning neural network, wherein the deep learning neural network is trained on a plurality of training samples generated from previous gameplay data, each training sample including a gameplay event and a response score associated with the gameplay event,
         wherein the previous gameplay data includes one or more of player video data, player audio data, or screen recording data, and
         wherein the training samples are generated by:
            identifying a gameplay event that occurred during a gameplay period captured in the screen recording data, and
            determining a player response associated with the identified gameplay event based on one or more of the player video data, the player audio data, or the screen recording data; and
      generating a prediction of a player response to the game element using the deep learning neural network.

14. The system of claim 13, wherein the data representing the game element comprises a text string.

15. The system of claim 13, wherein the prediction of the player response comprises a numerical value representing a probability that a player will like the game element.

16. The system of claim 13, wherein the prediction of the player response indicates whether a player is likely to experience a positive emotion, a negative emotion, or a neutral emotion in response to the game element.

17. The system of claim 13, wherein the game element is a first game element, and wherein the operations further comprise determining, using the deep learning neural network, a second game element that, when modified, improves the prediction of the player response to the first game element.

18. The system of claim 13, wherein the deep learning neural network is configured to evaluate the game element for potential inclusion in a game, and wherein the previous gameplay data comprises gameplay data of the game without the game element.

19. The system of claim 13, wherein the gameplay event is identified using a feature extraction and classification algorithm.

20. The system of claim 13, wherein the player response is determined using a sentiment analysis algorithm.

* * * * *